United States Patent
Siegel et al.

(10) Patent No.: US 11,748,280 B2
(45) Date of Patent: Sep. 5, 2023

(54) BROADCAST SCOPE SELECTION IN A DATA PROCESSING SYSTEM UTILIZING A MEMORY TOPOLOGY DATA STRUCTURE

(71) Applicant: INTERNATIONAL BUSINESS MACHINES CORPORATION, Armonk, NY (US)

(72) Inventors: Michael S. Siegel, Raleigh, NC (US); Guy L. Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 17/394,117

(22) Filed: Aug. 4, 2021

(65) Prior Publication Data
US 2023/0053882 A1 Feb. 23, 2023

(51) Int. Cl.
*G06F 13/40* (2006.01)
*G06F 13/16* (2006.01)

(52) U.S. Cl.
CPC ...... *G06F 13/1668* (2013.01); *G06F 13/4027* (2013.01)

(58) Field of Classification Search
None
See application file for complete search history.

(56) References Cited

U.S. PATENT DOCUMENTS

| | | | |
|---|---|---|---|
| 7,996,625 B2 * | 8/2011 | Khare | G06F 12/0817 711/146 |
| 10,726,079 B2 | 7/2020 | Makaremi et al. | |
| 10,783,777 B2 | 9/2020 | French et al. | |
| 2004/0088646 A1 * | 5/2004 | Yeager | H04L 67/104 715/255 |
| 2005/0080948 A1 * | 4/2005 | Rowlands | G06F 12/0815 710/36 |
| 2008/0120473 A1 * | 5/2008 | Fields | G06F 12/0833 711/146 |
| 2019/0042428 A1 * | 2/2019 | Guthrie | G06F 12/0897 |

OTHER PUBLICATIONS

Basic OSPF Configuration Lab, Cisco Systems, Inc.; 2007.
(Continued)

*Primary Examiner* — Michael Sun
(74) *Attorney, Agent, or Firm* — Brian F. Russell; Nathan Rau

(57) ABSTRACT

A coherent data processing system includes a system fabric communicatively coupling a plurality of nodes arranged in a plurality of groups. A plurality of coherence agents are distributed among the nodes and are assigned responsibility for certain addresses. A topology data structure indicates by group and node differing physical locations within the data processing system of the plurality of coherence agents. A master accesses the topology data structure utilizing a request address to obtain a particular group and node of a particular coherence agent uniquely assigned the request address. The master initially issues, on the system fabric, a memory access request specifying the request address and utilizing a remote scope of broadcast that includes the particular node and excludes at least one other node in the particular group, where the particular node is a different one of the plurality of nodes than a home node containing the master.

16 Claims, 10 Drawing Sheets

(56) References Cited

OTHER PUBLICATIONS

Feature Discovery Using Topological Data Analysis (TDA), Ayasdi; Apr. 2013.
Method to Simulate NUMA Topologies to Facilitate Testing of NUMA Aware Systems and Software, Anonymously; Feb. 14, 2017.
Dynamic Command Routing and Execution, Anonymously; Sep. 4, 2014.
Template-Driven SOA Topology Definition and Creation, Anonymously; Jan. 13, 2009.

* cited by examiner

BROADCAST SCOPE SELECTION IN A DATA PROCESSING SYSTEM UTILIZING A MEMORY TOPOLOGY DATA STRUCTURE

BACKGROUND

The present invention relates in general to data processing and, in particular, to communication of memory access requests in cache coherent data processing systems.

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of shared memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines of each cache hierarchy, as well as a set of coherency messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request.

Prior art snoop-based coherence protocols have generally, with some exceptions, assumed that to maintain coherency a global broadcast of memory access requests and associated coherence messages had to be employed. That is, that all memory access requests and all related coherence messages must be received by all coherence participants in an SMP computer system. More recently, some coherence protocols allow some memory access requests and the related coherence messages to be communicated with only a subset of the coherence participants in an SMP computer system.

BRIEF SUMMARY

According to one embodiment, the selection of the subset of coherence participants in a coherent data processing system that receive a memory access request and associated coherence messages can be intelligently selected based on a memory topology data structure.

In at least one embodiment, a coherent data processing system includes a system fabric communicatively coupling a plurality of nodes arranged in a plurality of groups. A plurality of coherence agents are distributed among the nodes and are assigned responsibility for certain addresses. A topology data structure indicates by group and node differing physical locations within the data processing system of the plurality of coherence agents. A master in the data processing system accesses the topology data structure utilizing a request address to obtain a particular group and node of a particular coherence agent uniquely assigned the request address. The master initially issues, on the system fabric, a memory access request specifying the request address and utilizing a remote scope of broadcast that includes the particular node and excludes at least one other node in the particular group, where the particular node is a different one of the plurality of nodes than a home node containing the master.

DETAILED DESCRIPTION

Figure 1:
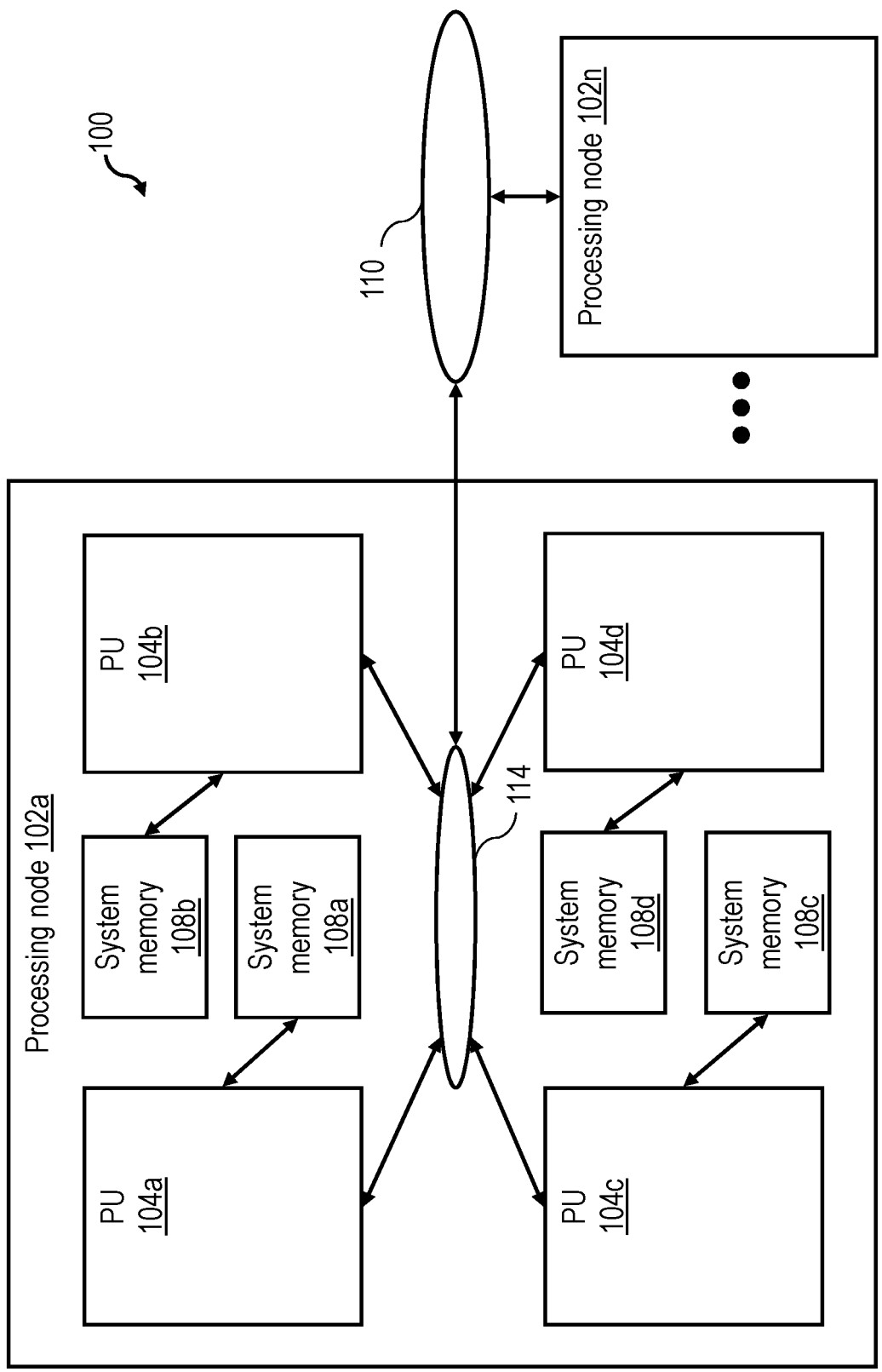
FIG. 1 is a high-level block diagram of an exemplary cache coherent data processing system that employs a snoop-based coherence protocol in accordance with one embodiment.

With reference now to the figures and, in particular, with reference to FIG. 1, there is illustrated a high level block diagram of an exemplary embodiment of a cache-coherent symmetric multiprocessor (SMP) data processing system that employs a snoop-based coherence protocol in accordance with one embodiment. As shown, data processing system 100 includes multiple nodes 102a-102n. Nodes 102a-102n are coupled to a system interconnect 110 for conveying address, data and control information. System interconnect 110 may be implemented, for example, as a bused interconnect, a switched interconnect or a hybrid interconnect.

In the depicted embodiment, one or more of nodes 102 are realized as multi-chip modules (MCMs), each containing multiple (e.g., four) processing units 104a-104d. Each processing unit 104 is preferably realized as a respective integrated circuit chip including a substrate on which integrated circuit is formed as is known in the art. The processing units 104a-104d, if any, within a node 102 are coupled for communication by a local interconnect 114, which, like system interconnect 110, may be implemented with one or more buses and/or switches. System interconnect 110 and local interconnects 114 collectively form an interconnect fabric.

The devices coupled to each local interconnect 114 can include not only processing units 104, but also one or more system memories 108a-108d. Data and instructions residing in system memories 108 can generally be accessed and modified by a processor core in any processing unit 104 in any node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
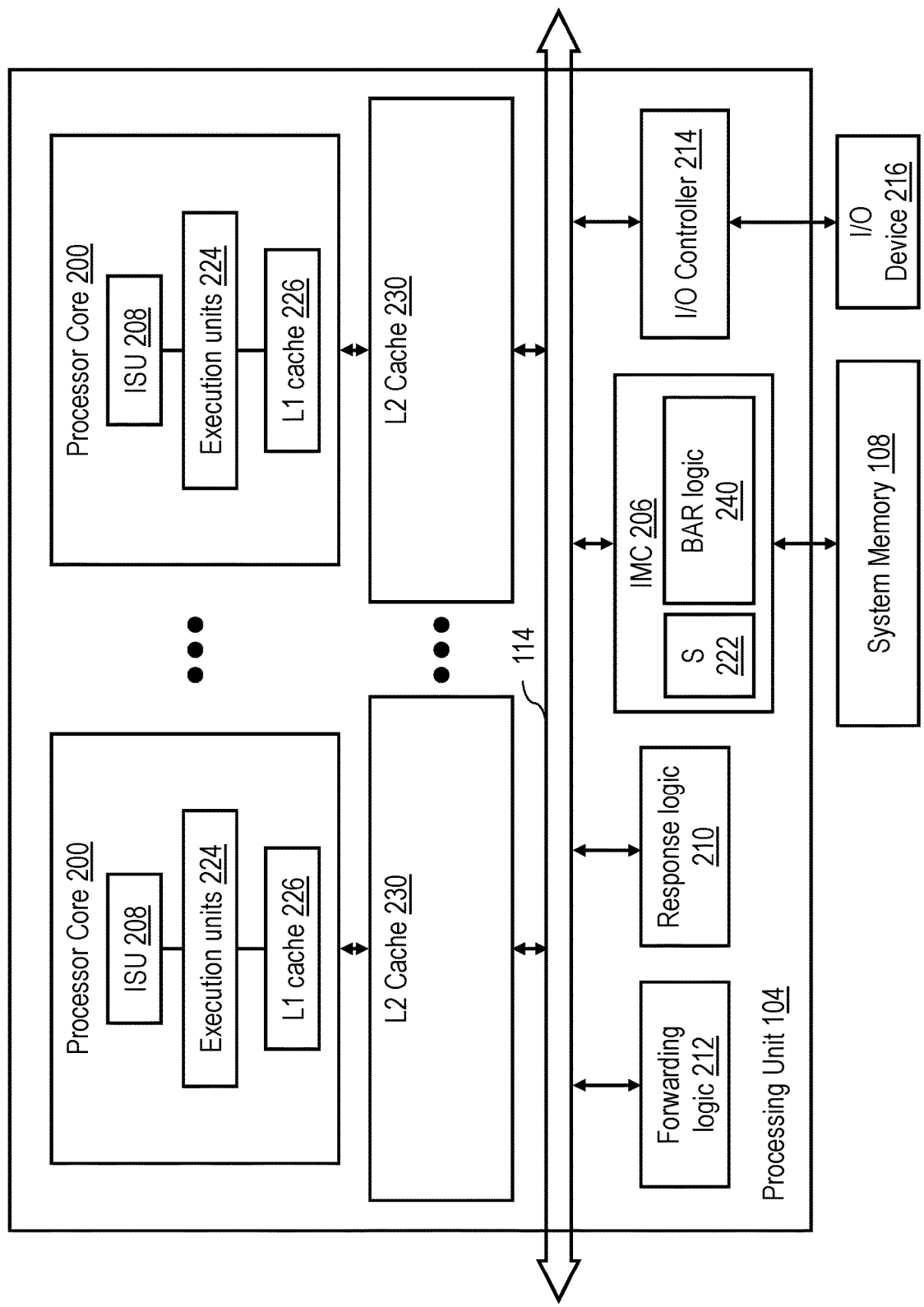
FIG. 2 is a more detailed block diagram of a processing unit within the data processing system of FIG. 1 in accordance with one embodiment.

Referring now to FIG. 2, there is depicted a more detailed block diagram of an exemplary processing unit 104 in accordance with one embodiment. In the depicted embodiment, each processing unit 104 includes multiple processor cores 200 for independently processing instructions and data. In a preferred embodiment, each processor core 200 supports simultaneous multithreading (SMT) and thus is capable of independently executing multiple hardware threads of execution simultaneously. Each processor core 200 includes at least an instruction sequencing unit (ISU) 208 for fetching and ordering instructions for execution and one or more execution units 224 for executing instructions. The instructions executed by execution units 224 include instructions that request access to a memory block or cause the generation of a request for access to a memory block.

The operation of each processor core 200 is supported by a multi-level memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its node 102 in response to processor and I/O requests on the local interconnect 114. IMC 206 includes one or more snoopers 222 for servicing snooped requests and base address register (BAR) logic 240 by which IMC 206 determines the real addresses that are assigned to storage locations in its system memory 108 (and thus the real addresses for which IMC 206 is responsible).

In the illustrative embodiment, the cache memory hierarchy of processing unit 104 includes a private store-through level one (L1) cache 226 within each processor core 200 as well as a private store-in level two (L2) cache 230. Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Each processing unit 104 further includes an instance of response logic 210, which, as discussed further below, implements a portion of the distributed snoop-based coherency signaling mechanism that maintains cache coherency within data processing system 100. In addition, each processing unit 104 includes an instance of forwarding logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
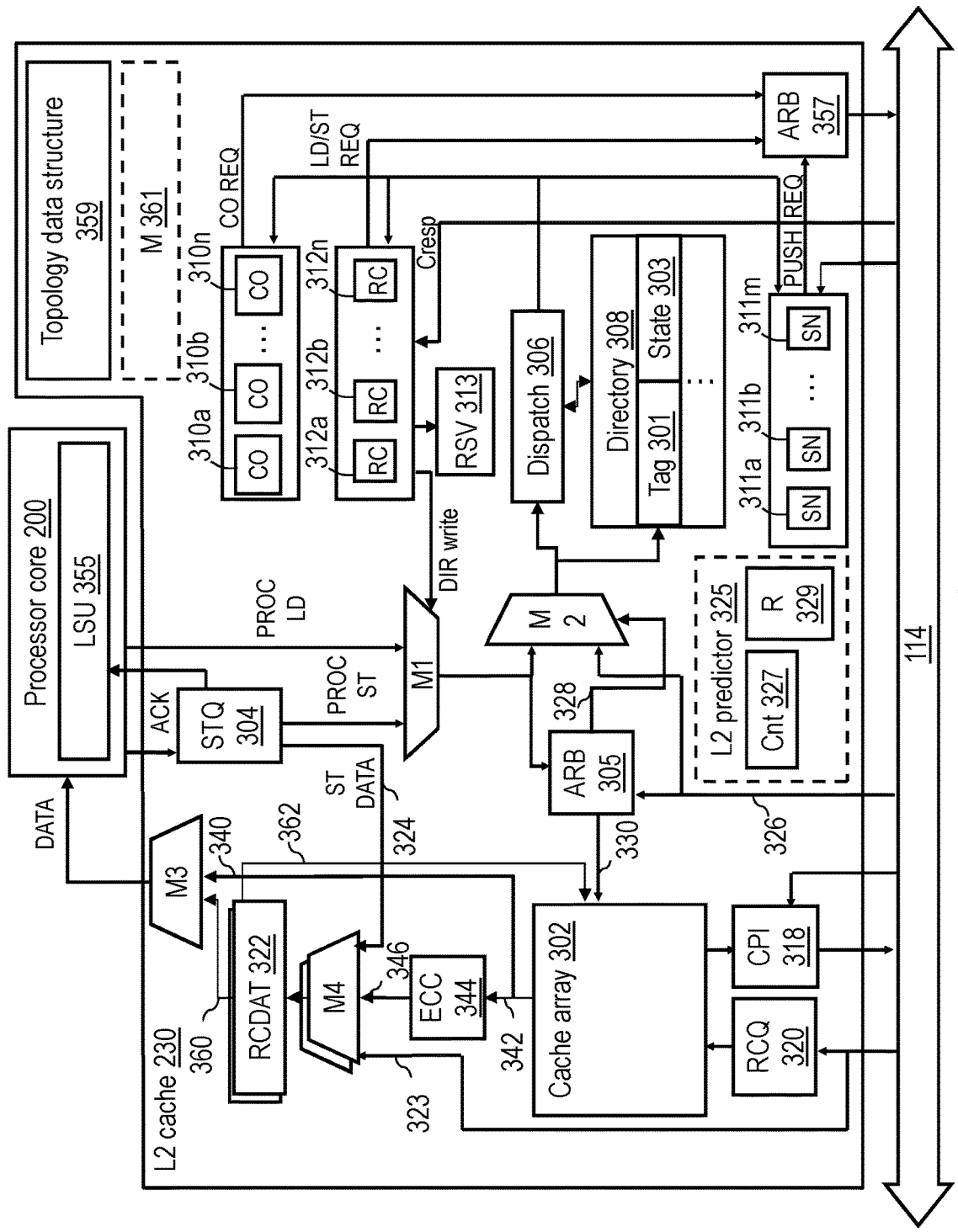
FIG. 3 is a more detailed block diagram of the L2 cache of FIG. 2.

With reference now to FIG. 3, there is illustrated a more detailed block diagram of an exemplary embodiment of an exemplary L2 cache 230 in accordance with one embodiment. As shown in FIG. 3, L2 cache 230 includes a cache array 302 and a directory 308 of the contents of cache array 502. Although not explicitly illustrated, cache array 302 is preferably implemented with a single read port and a single write port to reduce the die area required to implement cache array 302.

Assuming cache array 302 and directory 308 are set-associative as is conventional, memory locations in system memories 108 are mapped to particular congruence classes within cache array 302 utilizing predetermined index bits within the system memory (real) addresses. The particular memory blocks stored within the cache lines of cache array 302 are recorded in cache directory 308, which contains one directory entry for each cache line. As understood by those skilled in the art, each directory entry in L2 directory 308 comprises at least a tag field 301, which specifies the particular cache line stored in cache array 302 utilizing a tag portion of the corresponding real address, and a state field 303, which indicates the cache state of the cache line. As utilized herein, the term "cache state" includes (1) a sharing state providing information regarding the sharing (or non-sharing) of the associated cache line among caches within data processing system 100 and/or (2) a domain state providing information regarding the coherence domain(s) in which the associated cache line is then cached (or may possibly be cached).

L2 cache 230 further includes multiple (e.g., 16 or 32) read-claim (RC) machines 312a-312n for independently and concurrently servicing load (LD) and store (ST) requests received from the affiliated processor core 200. In addition, L2 cache 230 includes multiple (e.g., 16 or 32) snoop (SN) machines 311a-311m to service remote memory access requests originating from processor cores 102 other than the affiliated processor core 200. Each snoop machine 311 can independently and concurrently handle a remote memory access request "snooped" from local interconnect 114. As will be appreciated, the servicing of memory access requests by L2 cache 230 may require the replacement or invalidation of memory blocks within cache array 302. Accordingly, L2 cache 230 includes CO (castout) machines 310a-310n that manage the removal and writeback of memory blocks from cache array 302.

L2 cache 230 also includes an RC queue 320 and a CPI (castout push intervention) queue 318 that respectively buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the CO machines 310 and SN machines 311, such that each CO machine 310 and each SN machine 311 that is dispatched retrieves data from only the respective designated CPI buffer entry.

Each RC machine 312 also has assigned to it a respective one of multiple RC data (RCDAT) buffers 322 for buffering a memory block read from cache array 302 and/or received from local interconnect 114 via reload bus 323. The RCDAT buffer 322 assigned to each RC machine 312 is preferably constructed with connections and functionality corresponding to the memory access requests that may be serviced by the associated RC machine 312. At least some of RCDAT buffers 322 have an associated store data multiplexer M4 that selects data bytes from among its inputs for buffering in the RCDAT buffer 322 in response unillustrated select signals generated by arbiter 305.

Arbiter 305 is additionally configured to control multiplexers M1-M2 to order the processing of local memory access requests received from the affiliated processor core 200 and remote requests snooped on local interconnect 114. Memory access requests, including local load and store operations and remote read and write operations, are forwarded in accordance with the arbitration policy implemented by arbiter 305 to a dispatch pipeline 306, where each read/load and store request is processed with respect to directory 308 and cache array 302 over a given number of cycles.

L2 cache 230 also provides support for atomic updates by the associated processor core(s) 102 through the implementation of reservation logic 313, which tracks reservations established by atomic load (e.g., load-and-reserve (LARX)) requests to ensure that corresponding atomic store (e.g., store-conditional (STCX)) requests only complete successfully if the reserved cache lines have not been modified since the reservations were established (i.e., if the relevant reservation is still valid). In a typical embodiment, reservation logic 313 includes, for each thread, a respective reservation address register that specifies the base address of a cache line for which a reservation is established and a reservation flag indicating whether or not the reservation for the specified cache line is still valid.

In operation, processor store requests comprising a transaction type (ttype), target real address, and store data are received from the affiliated processor core 200 within a store queue (STQ) 304. From STQ 304, the store data are transmitted to store data multiplexer M4 via data path 324, and the store type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote request received from local interconnect 314 via remote request path 326. Arbiter 305 schedules local and remote memory access requests for processing and, based upon the scheduling, generates a sequence of select signals 328. In response to select signals 328 generated by arbiter 305, multiplexer M2 selects either the local request received from multiplexer M1 or the remote request snooped from local interconnect 114 as the next memory access request to be processed.

A request selected for processing by arbiter 305 is placed by multiplexer M2 into dispatch pipeline 306. Dispatch pipeline 306 preferably is implemented as a fixed duration pipeline in which each of multiple possible overlapping requests A, B, C, etc. is processed for a predetermined number of clock cycles. For example, dispatch pipeline 306 may process each request for four cycles.

During a first cycle of processing within dispatch pipeline 306, a 1-cycle directory read (lookup) is performed utilizing the request address to determine if the request address hits or misses in directory 308, and if the memory address hits, the cache state of the memory block within directory 308. The directory information, which includes a hit/miss indication and the cache state of the memory block, is returned by directory 308 to dispatch pipeline 306 in a subsequent cycle, such as the fourth cycle. As will be appreciated, no action is generally taken within an L2 cache 230 in response to miss on a remote memory access request; such remote memory requests are accordingly discarded from dispatch pipeline 306. However, in the event of a hit or miss on a local memory access request or a hit on a remote memory access request, L2 cache 230 will service the memory access request, which for requests that cannot be serviced entirely within processing unit 100, may entail communication of a memory access request on local interconnect 114, as discussed further below.

At a predetermined time during processing of the memory access request within dispatch pipeline 306, arbiter 305 transmits the request address to cache array 302 via address and control path 330 to initiate a cache read of the memory block specified by the request address. A cache read takes 2 cycles in the exemplary embodiment. The memory block read from cache array 302 is transmitted via data path 342 to error correcting code (ECC) logic 344, which checks the memory block for errors and, if possible, corrects any detected errors. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 make a dispatch determination. For example, dispatch pipeline 306 may make the dispatch determination based upon a number of criteria, including (1) the presence of an address collision between the request address and a previous request address currently being processed by a CO machine 310, SN machine 311, or RC machine 312, (2) the directory information, and (3) availability of an RC machine 312 (for a local request of the affiliated processor core 200) or SN machine 311 (for a snooped request of a remote processor core) to process the memory access request. If dispatch pipeline 306 makes a dispatch determination that the memory access request is to be dispatched, the memory access request is dispatched from dispatch pipeline 306 to an RC machine 312 or a SN machine 311, as appropriate. If the memory access request fails dispatch, the failure is signaled to the requestor (e.g., local or remote processor core 200) by a retry coherence response. The requestor may subsequently retry the failed memory access request, if necessary.

While an RC machine 312 is processing a local memory access request, the RC machine 312 has a busy status and is not available to service another request. While an RC machine 312 has a busy status, the RC machine 312 may perform a directory write to update the relevant entry of directory 308, if necessary. In addition, the RC machine 312 may perform a cache write to update the relevant cache line of cache array 302. A directory write and a cache write may be scheduled by arbiter 305 during any interval in which dispatch pipeline 306 is not already processing other requests according to the fixed scheduling of directory reads and cache reads. When all operations for the given request have been completed, the RC machine 312 returns to an unbusy state. It will be appreciated that the scheduling of non-fixed-schedule operations such as directory writes and cache writes can impact the scheduling of other operations, including those processed according to a fixed schedule.

As noted above, the processing performed by CO machines 310, SN machines 311, and RC machines 312 may require a memory access request to be issued on the system fabric, For example, CO machines 310 may issue CO requests, RC machines 312 may issue, among other things, read-type and store-type requests, and SN machines 311 may issue push requests. Requests of CO machines 310, SN machines 311, and RC machines 312 are ordered for presentation on the system fabric by an outbound request arbiter 357.

In preferred embodiments, each coherence participant that can initiate a memory access request on the system fabric of data processing system 100 has access to a topology data structure that indicates a relationship between the topology of data processing system 100 and the location of coherence participants assigned portions of the real address space. As explained further below, this topology data structure enables a coherence participant initiating a memory access request to intelligently specify a broadcast scope for the memory access request on the system fabric of data processing system 100. In the illustrated example, an instance of such a topology data structure 359 is implemented within each L2 cache 230 and is accessible to RC machines 312, CO machines 310, and SN machines 311. In some embodiments, L2 cache 230 additionally includes an optional mode field 361 indicating a currently implemented one of a plurality of possible formats for the entries in topology data structure 359.

In some embodiments, L2 cache 230 may additionally include an optional L2 predictor 325. As described further below with reference to FIGS. 8-9, L2 predictor 325 may be utilized to determine a broadcast scope of a request issued by L2 cache 230. In this example, L2 predictor 325 includes a counter 327 and a remote scope (R) flag 329, as discussed further below.

Figure 4:
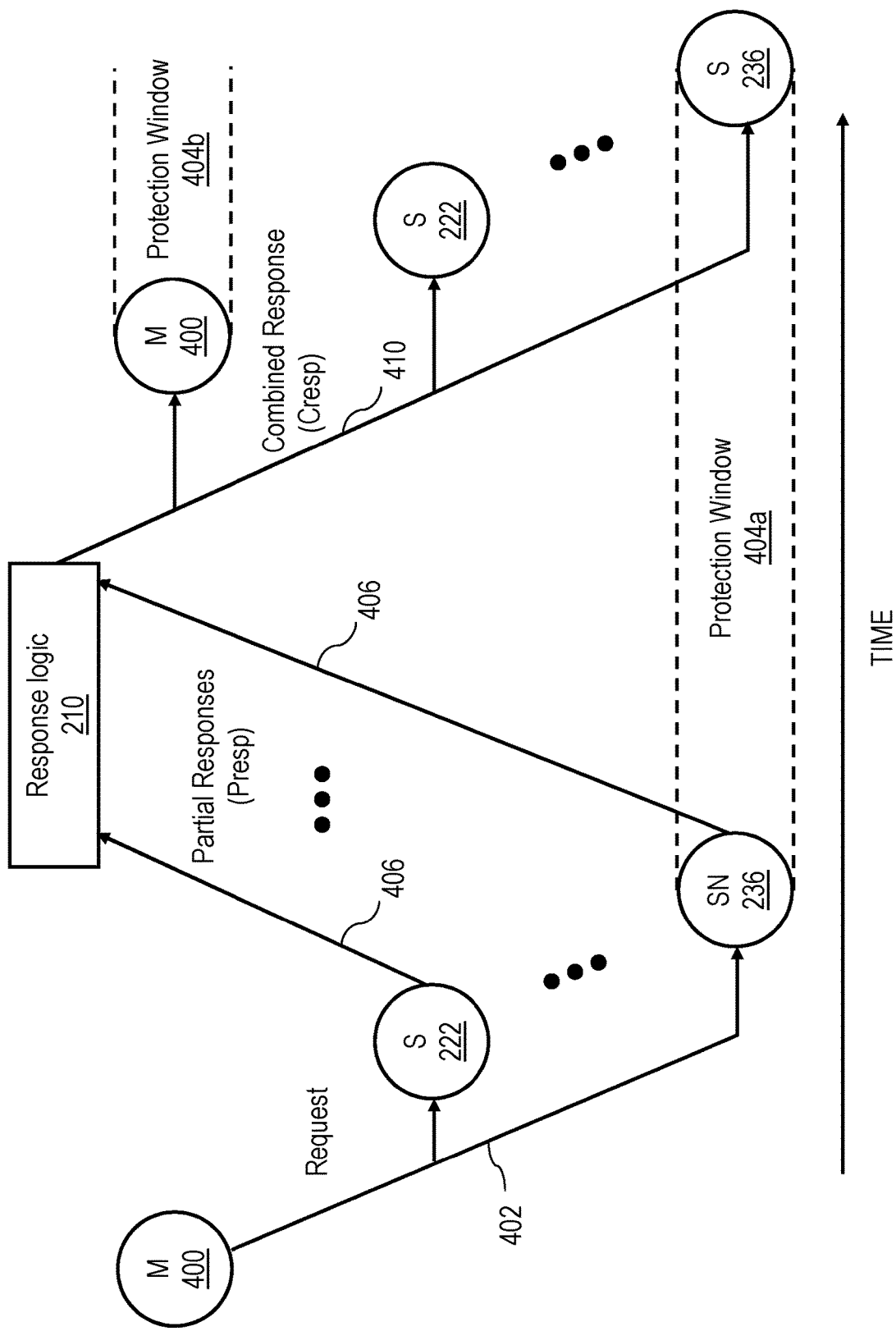
FIG. 4 is a time-space diagram of an exemplary transaction on the interconnect fabric of the data processing system of FIG. 1.

Referring now to FIG. 4, there is depicted a time-space diagram of an exemplary interconnect operation on a local or system interconnect 110, 114 of data processing system 100 of FIG. 1. The operation begins when a master 400, such as an RC machine 232 of an L2 cache 230 (or another master, such as an I/O controller 214) issues a request 402 on a local interconnect 114 and/or system interconnect 110 of data processing system 100. Request 402 preferably includes a transaction type indicating a type of desired access and a resource identifier (e.g., target real address) indicating a resource to be accessed by the request. Common types of requests preferably include those set forth below in Table I.

TABLE I

| Request | Description |
|---|---|
| READ | Requests a copy of the image of a memory block for query purposes |
| RWITM (Read-With- Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests destruction of all cached copies of a memory block and authority to update the memory block in system memory |

Request 402 is received by the SN machines 236 of L2 caches 230, as well as the snoopers 222 of memory controllers 206 (FIG. 1). In general, with some exceptions, the SN machines 236 in the same L2 cache 230 as an RC machine 232 that initiates a request 402 do not snoop that request 402 (i.e., there is generally no self-snooping) because a request 402 is transmitted on local interconnect 114 and/or system interconnect 110 only if the request 402 cannot be serviced internally by a processing unit 104. Snoopers 222 or SN machines 236 that receive request 402 may provide a respective partial response (Presp) 406 representing the response of at least that snooper to request 402. A snooper 222 within a memory controller 206 determines the partial response 406 to provide based, for example, on whether BAR logic 240 indicates the memory controller 206 is responsible for the request address and whether snooper 222 has resources available to service the request. An L2 cache 230 may determine its partial response 406 based on, for example, the availability of its L2 directory 238, the availability of a resources to handle the request (including an available SN machine 236), and the cache state associated with the request address in L2 directory 238.

The partial responses of snoopers 222 and 236 are logically combined either in stages or all at once by one or more instances of response logic 210 to determine a system-wide combined response (Cresp) 410 to request 402. Subject to the scope restrictions discussed below, response logic 210 provides combined response 410 to master 400 and snoopers 222, 236 via its local interconnect 114 and/or system interconnect 110 to indicate the system-wide response (e.g., Success, Retry, etc.) to request 402. If combined response 410 indicates success of request 402, combined response 410 may indicate, for example, a data source for a requested memory block, a cache state in which the requested memory block is to be cached by master 400, and whether "cleanup" operations invalidating the requested memory block in one or more caches 226, 230 are required.

In response to receipt of combined response 410, one or more of master 400 and snoopers 222, 236 typically perform one or more operations in order to service request 402. These operations may include supplying data to master 400, invalidating or otherwise updating the cache state of data cached in one or more L2 caches 230, performing castout operations, writing back data to a system memory 108, etc. As discussed further below, if required by request 402, a requested or target memory block may be transmitted to or from master 400 before or after the generation of combined response 410 by response logic 210.

The partial response provided by a snooper 222, 236 in response to a request and the operations performed the snooper in response to the request and/or its combined response will be described with reference to whether that snooper is a Highest Point of Coherency (HPC), a Lowest Point of Coherency (LPC), or neither with respect to the target address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 206 for the system memory 108 serving as a repository for the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a shared copy of the memory block to a requestor in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache state(s) within the L2 directory 238 of an L2 cache 230, as described further below with reference to Table II.

Still referring to FIG. 4, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG. 4, the snooper 236 that is the HPC for the memory block specified by the request address of request 402 protects the transfer of ownership of the requested memory block to master 400 during a protection window 404a that extends at least from the time that snooper 236 determines its partial response 406 until snooper 236 receives combined response 410 (and possibly thereafter). During protection window 404a, snooper 236 protects the transfer of ownership by providing partial responses 406 (e.g., Retry Presps) to other requests specifying the same request address that prevent other masters from obtaining ownership until ownership has been successfully transferred to master 400. Master 400 likewise initiates a protection window 404b to protect its ownership of the memory block requested in request 402 following receipt of combined response 410.

Because snoopers 222, 236 all have limited resources for handling the CPU and I/O requests described above, several different levels of partial responses and corresponding combined responses are possible. For example, if a snooper 222 within a memory controller 206 that is responsible for a requested memory block has a queue available to handle a request, the snooper 222 may respond with a partial response indicating that it is able to serve as the LPC for the request. If, on the other hand, the snooper 222 has no queue available to handle the request, the snooper 222 may respond with one or more partial responses (e.g., LPC_Ack and Retry) indicating that is the LPC for the memory block, but is unable to currently service the request. Similarly, an L2 cache 230 may require an available SN machine 236 and access to L2 directory 302 in order to handle a snooped request 402. Absence of access to either (or both) of these resources results in a partial response (and corresponding CR) signaling an inability to service the request due to absence of a required resource (e.g., a Retry).

Conventional broadcast-based data processing systems handle both cache coherency and data delivery through broadcast communication, which, in at least some conventional systems, is globally transmitted on an interconnect fabric to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the interconnect fabric is multiplied, meaning that system cost rises sharply with system scale as more bandwidth is required for communication over the interconnect fabric. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce traffic volume while still maintaining a broadcast-based coherency mechanism, preferred embodiments of the present invention implement coherency domains, which can conveniently be (but are not required to be) implemented with each node 102 forming a separate coherency domain. For the purposes of the explaining exemplary operation of data processing system 100, it will hereafter be assumed that all coherency domains have boundaries defined by sets of one or more nodes 102.

The implementation of coherency domains reduces system traffic by limiting inter-domain broadcast communication over system interconnect 110 in cases in which requests can be serviced with participation by fewer than all coherency domains. For example, if processing unit 104a of node 102a has a READ operation to issue, then processing unit 104a may elect to first broadcast the READ operation to all coherence participants within its own coherency domain (e.g., node 102a), but not to coherence participants in other coherency domains (e.g., node 102n). A broadcast operation transmitted to only those coherence participants within the same coherency domain as the master of the operation is defined herein as a "local node operation" having a "local node" scope of broadcast. If the local READ operation can be serviced within solely the coherency domain of processing unit 104a, then no further broadcast of the READ request need be or is performed. If, however, the partial responses and combined response to the local READ request indicate that the READ request cannot be serviced solely within the local coherency domain of node 102a, the scope of the broadcast may then be extended to include, in addition to the local coherency domain, one or more additional coherency domain(s).

Figure 5A:
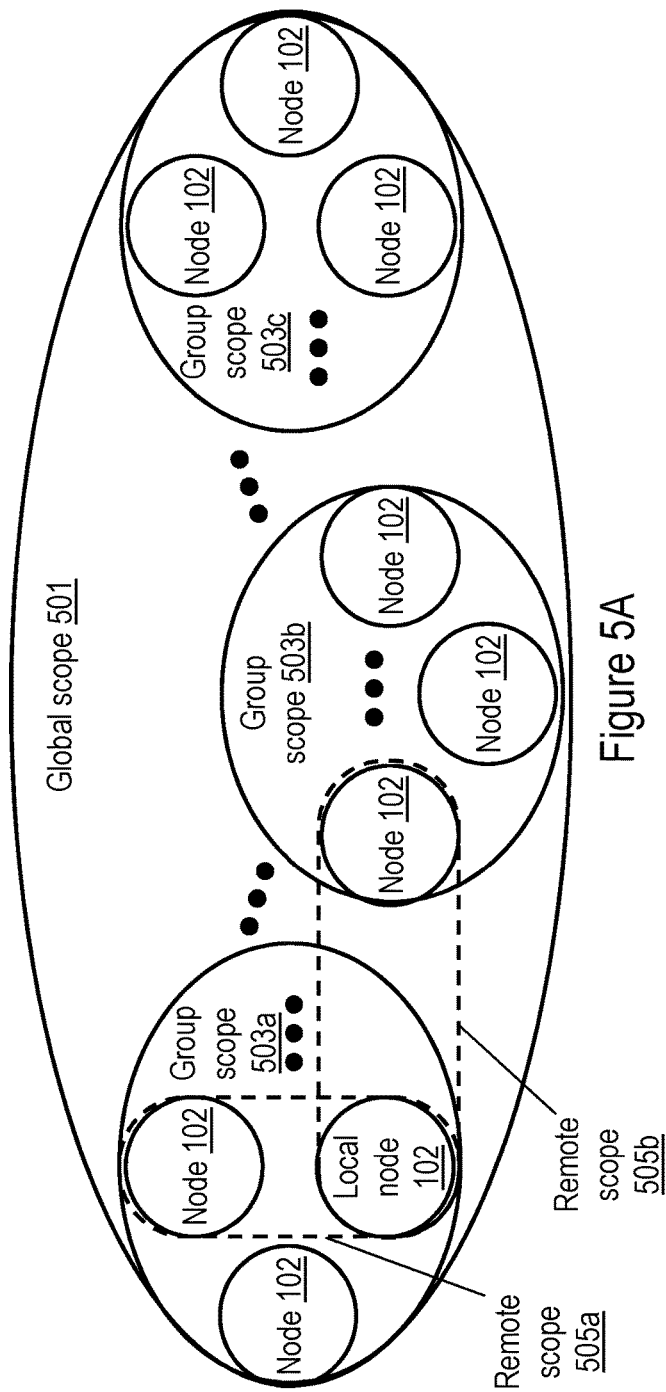
FIG. 5A depicts various scopes of operations on the interconnect fabric of the data processing system of FIG. 1.

In addition to a "local node" scope, data processing system 100 preferably supports a "global" scope 501 including all of the coherency domains in the SMP data processing system, as shown in FIG. 5A. Thus, an operation that is transmitted to all coherency domains in an SMP data processing system is defined herein as a "global operation". Of course, one or more supersets of the local broadcast scope can be defined intermediate the local scope and the global scope. For example, FIG. 5A illustrates an embodiment in which data processing system 100 optionally implements a plurality of node groups, where an operation broadcast from one node 102 to all nodes 102 within the node group defines an operation of "group" scope (e.g., one of group scopes 503a, 505b or 503c).

In a preferred embodiment, the possible broadcast scopes for an operation additionally include a "remote" scope, which is defined to include the local coherency domain (e.g., the local node 102) containing the master that initiates the operation and a single other remote coherency domain (e.g., a remote node 102), while excluding at least one other peer coherency domain (e.g., a node 102 other than the local and remote nodes 102). It should be noted that the local coherency domain, the remote coherency domain, and the peer coherency domain are non-overlapping in scope. For example, FIG. 5A explicitly illustrates two of the possible remote scopes for local node 102, which are identified as remote scope 505a and remote scope 505b, respectively.

Depending on the structure of the system fabric, some embodiments of data processing system 100 may also support a "remote node only" scope that transmits at least a subset of memory access requests (e.g., castout requests and push requests) to a single remote node without being snooped by coherence participants in the local node 102. For ease of understanding, it will hereafter be assumed that data processing system 100 supports the local node scope, remote scope, group scope, and global scope, but does not support the "remote node only" scope. Upon reference to the following discussion, those skilled in the art will appreciate the modifications to the disclosed embodiments that would be required or useful to additionally support the "remote node only" scope of broadcast.

In a preferred embodiment, the scope of an operation is indicated within an interconnect operation by a scope indicator (signal). Forwarding logic 212 within processing units 104 preferably determines whether or not to forward an operation received via local interconnect 114 onto system interconnect 110 based upon the setting of the scope indicator (signal) in the interconnect operation.

Figure 5B:
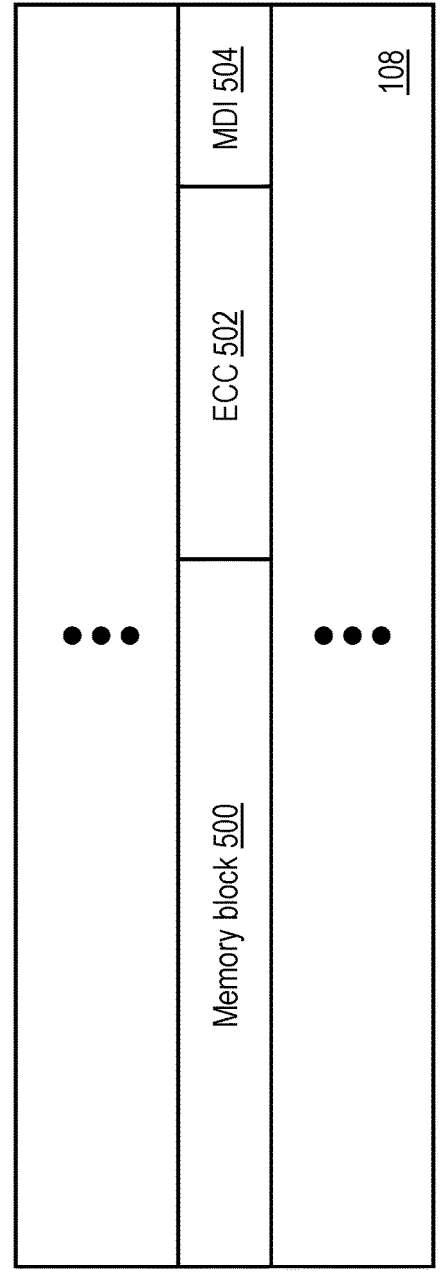
FIG. 5B illustrates a memory domain indicator (MDI) in accordance with one embodiment.

In order to limit the issuance of unneeded global operations and thereby reduce operational latency and conserve additional bandwidth on local interconnects, the present invention preferably implements a domain indicator per memory block that indicates whether or not a copy of the associated memory block may be cached outside of the local coherency domain. For example, FIG. 5B depicts an exemplary implementation of a domain indicator in accordance with one embodiment. As shown in FIG. 5B, a system memory 108, which may be implemented, for example, in dynamic random access memory (DRAM), static RAM, flash memory, or other memory technology, stores a plurality of memory blocks 500. System memory 108 stores in association with each memory block 500 an associated error correcting code (ECC) 502 utilized to correct errors, if any, in memory block 500 and a memory domain indicator (MDI) 504. Although in some embodiments of the present invention, MDI 504 may identify a particular coherency domain (i.e., specify a coherency domain or node ID), it is hereafter assumed that memory domain indicator (MDI) 504 is a 1-bit flag that is set (e.g., to '1' to indicate "local") if the associated memory block 500 is cached, if at all, only within the same coherency domain as the memory controller 206 serving as the LPC for the memory block 500. An MDI 504 is reset (e.g., to '0' to indicate "global") otherwise. The setting of MDI bits 504 to indicate "local" may be implemented imprecisely in that a false setting of "global" will not induce any coherency errors, but may cause unneeded global broadcasts of operations.

Importantly, memory controllers 206 that source a memory block in response to a request preferably transmit the associated MDI 504 in conjunction with the requested memory block. It should also be appreciated that a multiplicity of interconnect operations of various scopes can be "in flight" in data processing system 100 at any given time.

The present invention preferably implements a cache coherency protocol designed to leverage the implementation of coherency domains as described above. In a preferred embodiment, the cache states within the protocol, in addition to providing (1) an indication of whether a cache is the HPC for a memory block, also indicate (2) whether the cached copy is unique (i.e., is the only cached copy system-wide) among caches at that memory hierarchy level, (3) whether and when the cache can provide a copy of the memory block to a master of a request for the memory block, (4) whether the cached image of the memory block is consistent with the corresponding memory block at the LPC (system memory), and (5) whether another cache outside the local coherency domain (possibly) holds a cache entry having a matching address. These five attributes can be expressed, for example, in an exemplary variant of the well-known MESI (Modified, Exclusive, Shared, Invalid) protocol summarized below in Table II.

TABLE II

| Cache State | HPC? | Unique? | Can allow cache to serve as data source? | Consistent with LPC? | Cached outside local domain? | Legal concurrent states |
|---|---|---|---|---|---|---|
| M | Yes | yes | yes, before Cresp | No | no | I, Ig (& LPC) |
| Me | yes | yes | yes, before Cresp | yes | no | I, Ig (& LPC) |
| T | yes | unknown | yes, after Cresp if none provided before Cresp | no | unknown | Sr, S, I, Ig (& LPC) |
| Tn | yes | unknown | yes, after Cresp if none provided before Cresp | no | no | Sr, S, I, Ig (& LPC) |
| Te | yes | unknown | yes, after Cresp if none provided before Cresp | yes | unknown | Sr, S, I, Ig (& LPC) |
| Ten | yes | unknown | yes, after Cresp if none provided before Cresp | yes | no | Sr, S, I, Ig (& LPC) |
| Sr | no | unknown | yes, before CR | unknown | unknown | T, Tn, Te, Ten, S, I, Ig (& LPC) |
| S | no | unknown | no | unknown | unknown | T, Tn, Te, Ten, Sr, S, I, Ig (& LPC) |
| I | no | n/a | no | n/a | unknown | M, Me, T, Tn, Te, Ten, Sr, S, I, Ig (& LPC) |
| Ig | no | n/a | no | n/a | Assumed so, in absence of other information | M, Me, T, Tn, Te, Ten, Sr, S, I, Ig (& LPC) |

In order to avoid having to access the LPC to determine whether or not the memory block is known to be cached, if at all, only locally, the Ig (Invalid global) coherency state is utilized to maintain a domain indication in cases in which no copy of a memory block remains cached in a coherency domain. The Ig state is defined herein as a cache coherency state indicating (1) the associated memory block in the cache array is invalid, (2) the address tag in the cache directory is valid, and (3) a copy of the memory block identified by the address tag may possibly be cached in another coherency domain.

The Ig state is formed in a lower level cache in response to that cache providing a requested memory block to a requestor in another coherency domain in response to an exclusive access request (e.g., a bus RWITM operation). In some embodiments of the present invention, it may be preferable to form the Ig state only in the coherency domain containing the LPC for the memory block. In such embodiments, some mechanism (e.g., a partial response by the LPC and subsequent combined response) must be implemented to indicate to the cache sourcing the requested memory block that the LPC is within its local coherency domain. In other embodiments that do not support the communication of an indication that the LPC is local, an Ig state may be formed any time that a cache sources a memory block to a remote coherency node in response to an exclusive access request.

Because cache directory entries including an Ig state carry potentially useful information, it is desirable in at least some implementations to preferentially retain entries in the Ig state over entries in the I state (e.g., by modifying the Least Recently Used (LRU) algorithm utilized to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries.

Several rules govern the selection and replacement of Ig cache entries. First, if a cache selects an Ig entry as the victim for replacement, a castout of the Ig entry is performed (unlike the case when an I entry is selected). Second, if a request that causes a memory block to be loaded into a cache hits on an Ig cache entry in that same cache, the cache treats the Ig hit as a cache miss and performs a castout operation with the matching Ig entry as the selected victim. The cache thus avoids avoid placing two copies of the same address tag in the cache directory. Third, the castout of the Ig state is preferably performed as a local operation, or if performed by a remote master, is ignored by the LPC of the castout address. If an Ig entry is permitted to form in a cache that is not within the same coherency domain as the LPC for the memory block, no update to the domain indicator in the LPC is required. Fourth, the castout of the Ig state is preferably performed as a dataless address-only operation in which the domain indicator is updated to "global" at the LPC (if local to the cache performing the castout).

Implementation of an Ig state improves communication efficiency by maintaining a cached domain indicator for a memory block in a coherency domain even when no valid copy of the memory block remains cached in the coherency domain. As a consequence, an HPC for a memory block can service an exclusive access request (e.g., a snooped RWITM operation) from a remote coherency domain without retrying the request and performing a push of the requested memory block to the LPC.

In a typical implementation of the system fabric of data processing system 100, the bandwidth available on the system fabric for memory access requests varies inversely with the broadcast scope. Thus, for example, broadcasts of the local node scope have the greatest available bandwidth, then the remote scope, and then the group scope, with the system scope having the least available bandwidth. Consequently, system performance and resource utilization are improved if masters issue memory access requests with as limited of scope as necessary to successfully complete the memory access requests. The implementation of MDI bits 504 and cache states as described above provide enough information for a master to determine if a memory block may have left the "home node" in which the LPC for the memory blocks resides. In at least some embodiments, data processing system 100 additionally implements an unillustrated coarse coarse-grained memory coherence directory (MCD) per group scope 503 to additionally track whether a memory block having a target real address assigned to a LPC within the group scope 503 is likely cached outside of that group scope 503.

Based on scope information provided by the MDI bit 504, the cache states, and the MCDs, a master that initiates a memory access request on the system fabric can initially issue the memory access request with a more restricted scope of broadcast in which the memory access request can possibly or likely be serviced in accordance with the coherence protocol. If the initial scope of broadcast turns out to include less than all of the coherence participants necessary to maintain coherence while servicing the request (e.g., due to the target memory block being cached in a node 102 outside the initial broadcast scope), that fact is communicated back to the master in a Retry Cresp indicating that the memory access request should be reissued with a larger scope of broadcast. The master, in response to receipt of such as Retry Cresp can then reissue the memory access request one or more times with one or more increased scopes of broadcast until the memory access request can be successfully completed in accordance with the coherence protocol.

In prior art enterprise-class multi-node data processing systems, a master had no efficient way in which to determine the node location of a LPC assigned a given target real address. Consequently, in order to guarantee receipt of the memory access request by the necessary set of agents, which may include the LPC, any memory access request that would likely require snooping by the LPC would have to be issued either with an initial global scope of broadcast or issued at a smaller scope of broadcast and then repeatedly reissued with larger scopes of broadcast until the necessary coherence agents are included. In accordance with the disclosed embodiments, a master, such as an RC machine 312, SN machine 311, or CO machine 310 of L2 cache 230, can utilize a topology data structure 359 to determine the physical node location of LPCs within data processing system 100, enabling the master to intelligently employ memory access requests of local node scope and remote scope when possible, rather than incurring failed attempts at a smaller scope (e.g., local node scope) and/or devolving to memory access requests of group scope or global scope.

Figure 6:
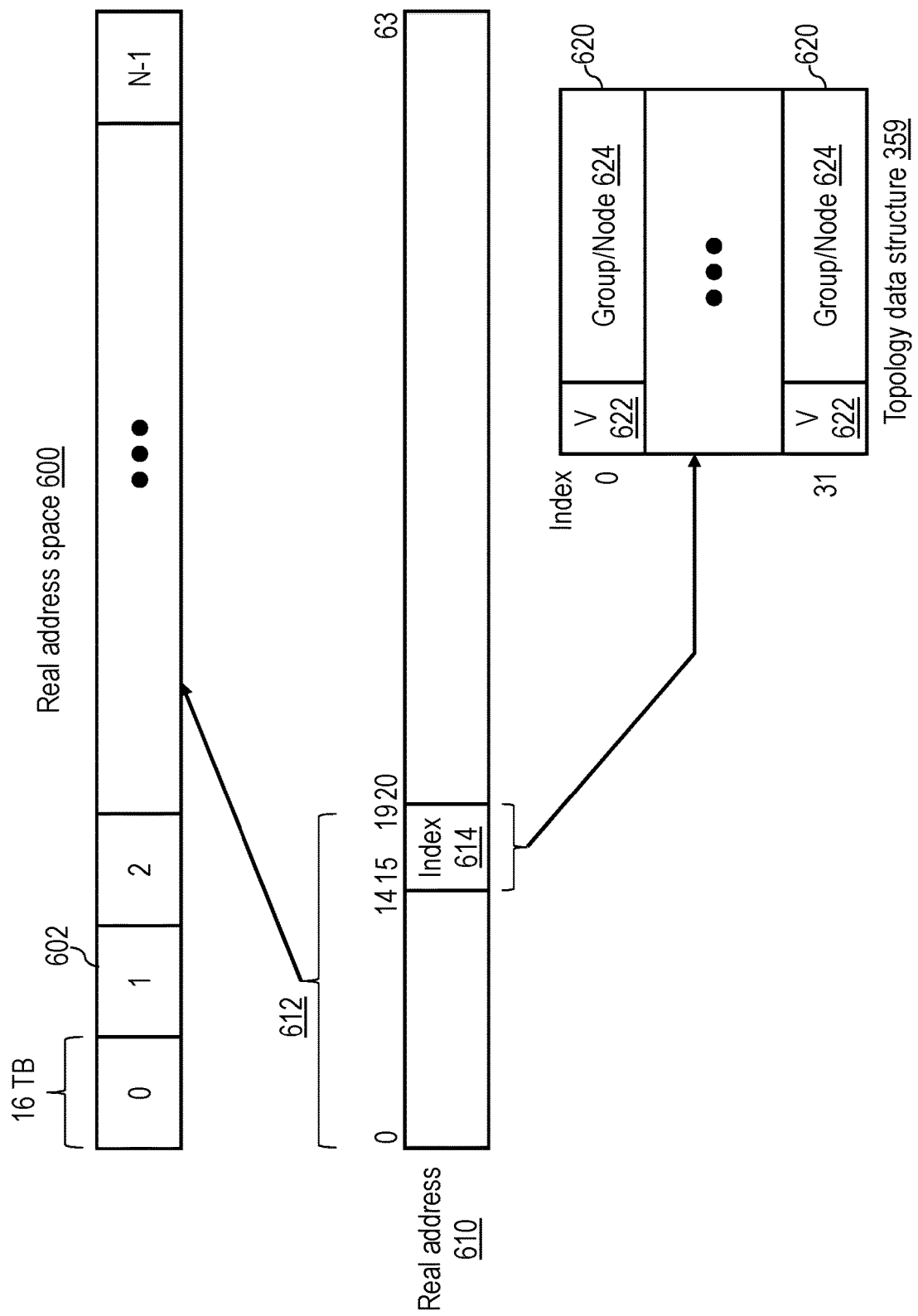
FIG. 6 depicts an exemplary topology data structure that indicates the physical locations within a data processing system of coherence participants assigned particular addresses within a real address space in accordance with one embodiment.

Referring now to FIG. 6, there is depicted one exemplary implementation of a topology data structure (e.g., topology data structure 359) that indicates the physical locations within a data processing system of coherence participants assigned particular addresses within a real address space in accordance with one embodiment. In the depicted example, a data processing system 100 has a real address space 600 formed of the maximum possible number of addressable data storage locations for memory blocks supported by data processing system 100. Real address space 600 is subdivided into N (a positive integer) memory blocks 602, which each may be, as one example, 16 terabytes (TB) in size. A particular one of the N (e.g., $2^{20}$) memory blocks 602 may be selected by a number (e.g., 20) of high order bits 612 in a real address 610 utilized to address real address space 600.

To enable topology data structure 359 to be compact while still providing insight into the node group and node 102 in which an LPC assigned a given real address 610 is located, an index 614 formed of the M lower-order bits of high order bits 612 is utilized to access a particular one of the M entries 620 in topology data structure 359. For example, if M is 32, then index 606 can be formed of the five lowest order bits (e.g., bits 15-19) of high order bits 612. In the given example, each entry 620 in topology data structure 359 includes two fields: a valid field 622 indicating whether the content of that entry 620 is valid and a group/node field 624 identifying the particular node group and node 102 in which the LPC assigned a given real address 610 is located. The contents of topology data structure can be initialized and updated, for example, by hypervisor software.

As alluded to above, an optional mode field 361 can be associated with topology data structure 359 and utilized to indicate a currently implemented one of a plurality of possible formats for entries in topology data structure 359. For example, mode field 361 can indicate a number of bits in group/node field 624 utilized to identify a node group and/or the number of bits in group/node field 624 utilized to identify a specific node 102. In this manner, multiple different configurations of data processing system 100 having varying numbers of node groups and nodes 102 can be supported with a common size of topology data structure 359.

Figure 7:
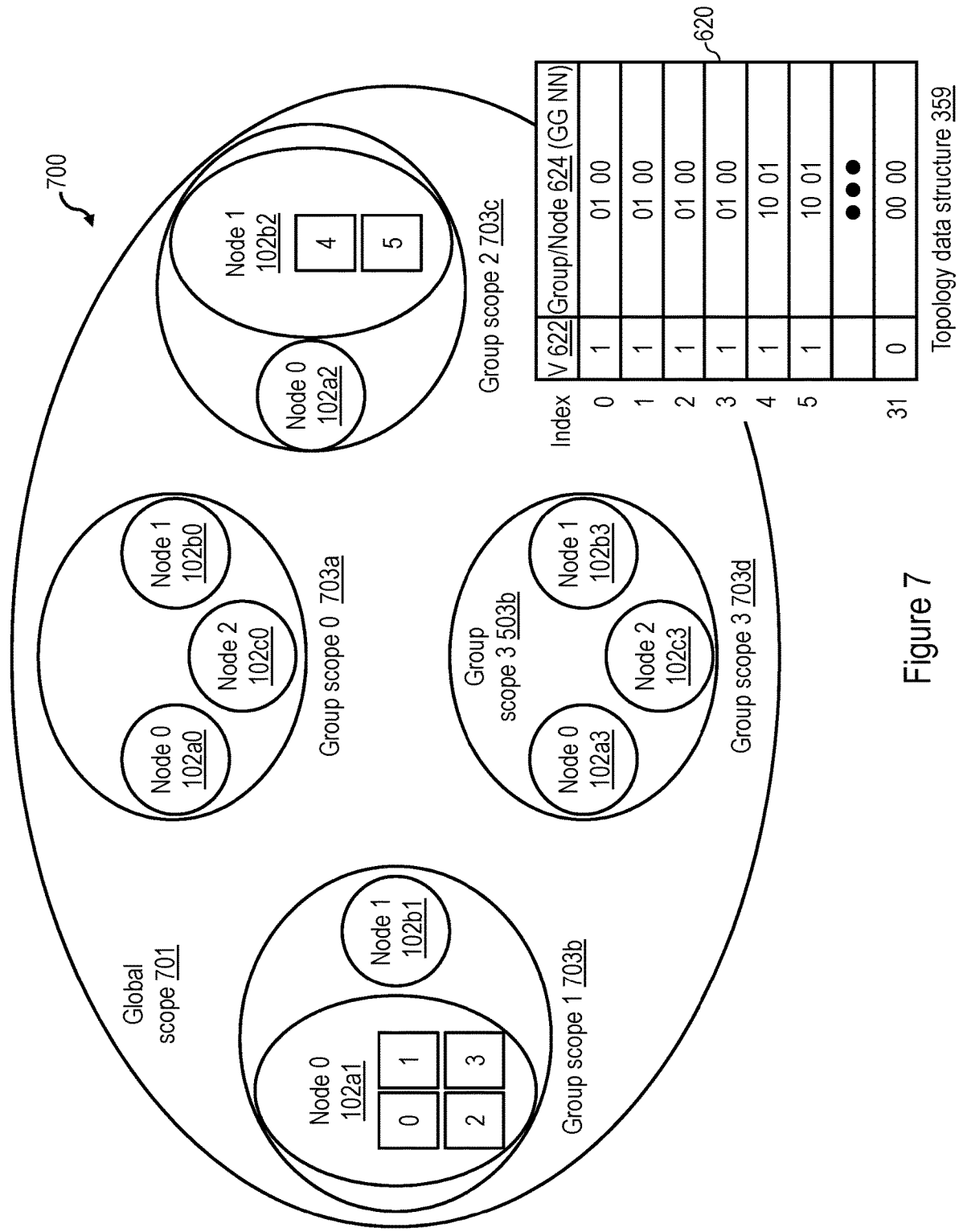
FIG. 7 illustrates an exemplary configuration of a multi-node data processing system and the corresponding contents of a topology data structure for the specific allocation of real memory addresses among the nodes of the multi-node data processing system in accordance with one embodiment.

With reference now to FIG. 7, there are illustrated a configuration of an exemplary multi-node data processing system 700 and the corresponding contents of a topology data structure 359 specifying the allocation of real memory addresses among the nodes 102 of multi-node data processing system 700 in accordance with one embodiment. In this example, multi-node data processing system 700 implements a global scope 701 includes four node groups defining group scopes 703a-703d. Group scope 0 703a includes three nodes: node 0 102a0, node 1 102b0, and node 2 102c0. Group scope 1 703b includes two nodes: node 0 102a1 and node 1 120b1. Group scope 2 703C also includes two nodes: node 0 102a2 and node 1 102b2. Finally, group scope 3 703d includes three nodes: node 0 102a3, node 1 120b3, and node 2 102c3. In this example, multi-node data processing system 700 utilizes addresses in six of the N memory blocks 602 within real address space 600. As shown, the LPCs for real addresses within the four memory blocks 602 numbered 0 to 3 are physically located in node 0 102a1 of group scope 1 703b, and the LPCs for the real addresses within the two memory blocks 602 numbered 4 and 5 are physically located in node 1 102b2 or group scope 2 703c.

The locations of LPCs for real addresses in the various memory blocks 602 are reflected in topology data structure 359. In this example, the group/node field 624 of each entry 620 in topology data structure 359 includes four bits and is formatted with the two initial bits ("GG") indicating the relevant group scope 703 and the last two bits ("NN") indicating a particular node 102 within the indicated group scope 703. As noted, in at least some embodiments, this formatting can be made selectable based on the setting of optional mode field 361.

With this arrangement, a master located in any of nodes 102 can easily access its associated topology data structure 359 utilizing index portion 614 of a real address 610 and determine, by reference to the relevant entry 620, the physical location of the LPC for the real address 610. For example, the master can determine that for real addresses 610 having indices 0 to 3 (i.e., b'00000' to b'00011') that the LPC(s) for these real addresses 610 are all found in group scope 1 703*b* (as indicated by b'01') and node 0 102*a*1 (as indicated by b'00'). Similarly, the master can determine that for real addresses 610 having indices 4 or 5 (i.e., b'00100' or b'00101') that the LPC(s) for these real addresses 610 are all found in group scope 2 703*c* (as indicated by b'10') and node 1 102*b*2 (as indicated by b'01'). It will be appreciated that each master will also be configured with its own node and group assignments through the use of tie-downs or one or more configuration registers. As a result, the master can selectively employ the remote scope of broadcast for memory access requests that may possibly be serviced by the LPC rather than being required to use a group scope or global scope of broadcast.

The diffusion of knowledge of the physical locations of the LPCs among the various masters of data processing system 100 also promotes greater flexibility in the system architecture. As one specific example, system memories 108 need not be evenly distributed among the various nodes 102 of data processing system 100 to promote reduction in the use of request broadcasts of broader scope (e.g., group and system scope); instead, system memories 108 can be unevenly distributed among nodes 102, up to and including locating most or all system memories 108 in one or more nodes 102 serving as a memory appliance (which may, in at least some cases, include no processing units 104).

Figure 8:
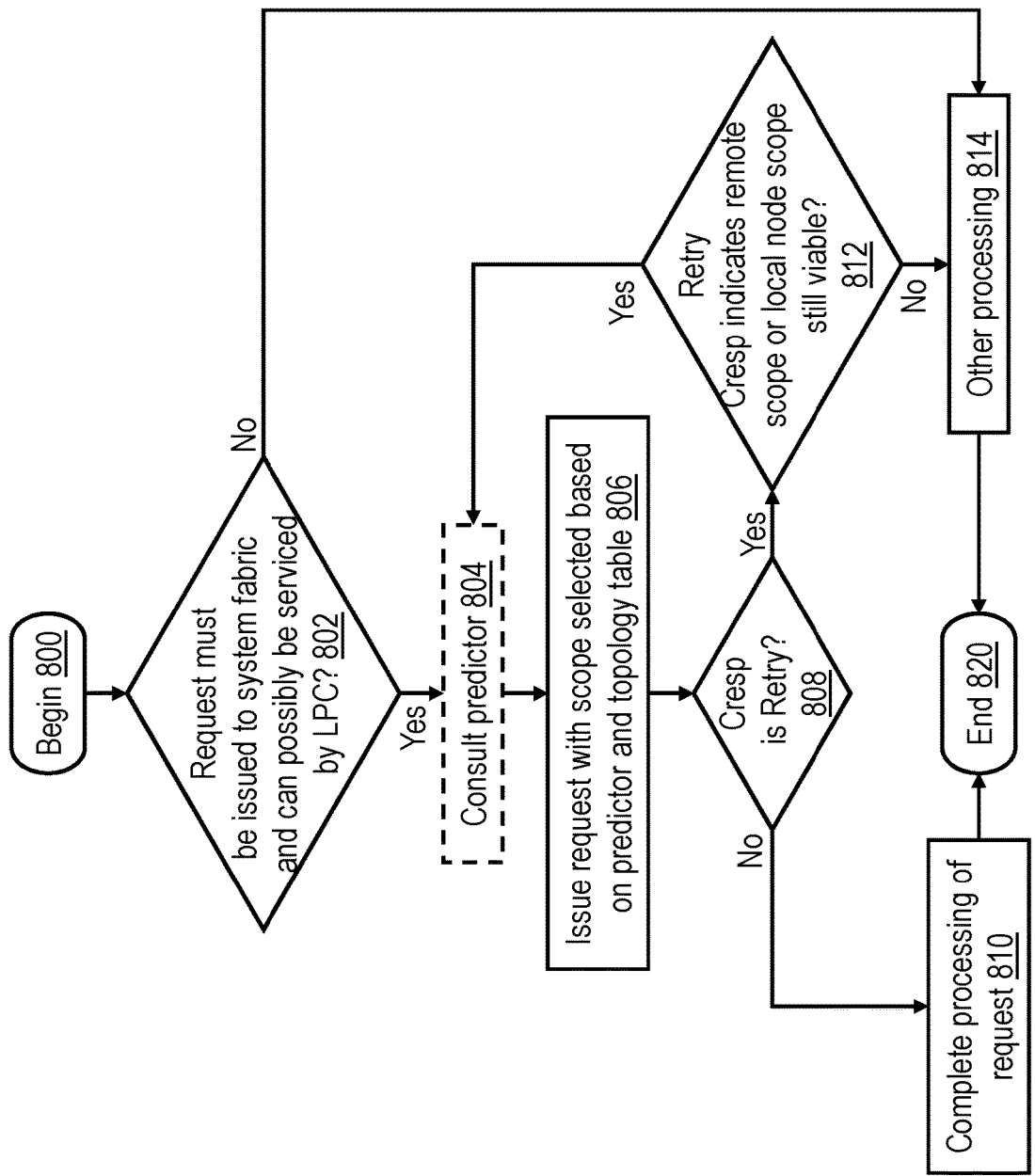
FIG. 8 is a high-level logical flowchart of an exemplary process by which a master in a data processing system issues memory access requests on a interconnect fabric using various broadcast scopes in accordance with one embodiment.

Referring now to FIG. 8, there is depicted a high-level logical flowchart of an exemplary process by which a master in a data processing system 100 issues memory access requests on a interconnect fabric using various broadcast scopes in accordance with one embodiment. The illustrated process begins at block 800 in response to a request being dispatched to a master for handling. The master may be, for example, a RC machine 312 of a L2 cache 230 or an I/O controller 214. The process then proceeds to block 802, which illustrates the master determining whether or not handling the request received at block 800 requires a memory access request to be issued on the system fabric of data processing system 100. The master can make this determination, for example, based on the type of the request and, if an RC machine 312, the result of the lookup of the target address of the request in directory 308. In addition, the master determines at block 802 whether or not the memory access request can possibly be serviced by an LPC. In response to the master determining that the memory access request must be issued on the system fabric and that the memory access request can possibly be serviced by an LPC, the process passes to optional block 804, which is described below. Otherwise, the master handles the request utilizing other, possibly conventional processing, as shown at block 814.

Referring now to block 804, if optional L2 predictor 325 is implemented, the master consults L2 predictor 325 to determine whether or not L2 predictor indicates that a remote scope of broadcast should be utilized. In the depicted embodiment, R flag 329 is set (e.g., to 1) to indicate that a remote scope of broadcast should be utilized and is otherwise reset (e.g., to 0). An exemplary process by which L2 predictor 325 sets and resets R flag 329 is described below in detail with reference to FIG. 9. At block 806, the master issues, on the system fabric of data processing system 100, a memory access request utilizing an initial scope of broadcast selected based on the R flag 329 of L2 predictor 325, if present, and the location of the LPC of the target real address of the memory access request as indicated by topology data structure 359. For example, if topology data structure 359 indicates the LPC is in the local node 102 of the master, the master may issue the memory access request on the system fabric of data processing system 100 initially utilizing a local node scope of broadcast regardless of the current setting of R flag 329. If topology data structure 359 indicates that the LPC is in a different node 102 than the master and L2 predictor 325 is omitted, the master preferably issues the memory access request on the system fabric of data processing system 100 initially utilizing a remote scope of broadcast including only the node 102 containing the master and the node 102 identified by topology data structure 359 as containing the LPC. If topology data structure 359 indicates that the LPC is in a different node 102 than the master and L2 predictor 325 is present and indicates not to employ the remote scope of broadcast (i.e., R flag 329 is reset), the master preferably initially issues the memory access request on the system fabric of data processing system 100 utilizing at least a group scope of broadcast including the group scope identified by topology data structure 359 as containing the LPC.

After issuing the initial broadcast of the memory access request on the system fabric of data processing system 100, the master monitors for receipt of the Cresp for the memory access request, and when received, determines if the Cresp is a Retry Cresp. If not, the memory access request was successful, and the master completes processing of the initial request in accordance with the coherence protocol of data processing system 100 (block 810). The process of FIG. 8 thereafter ends at block 820. If, however, the master determines at block 808 that the Cresp for the memory access request is a Retry Cresp, the master additionally determines at block 812 whether or not reissuing of the memory access command utilizing a remote scope or local node scope remain viable, that is, may possibly result in a Cresp other than Retry. For example, if the Retry Cresp indicates that the Retry is due to a collision with a pending prior request to the same target real address or due to a lack of an available snooper (e.g., a snooper 222), then master may make an affirmative determination at block 812. In response to an affirmative determination, the process returns to optional block 804, which has been described. If, however, the master makes a negative determination at block 812, the master completes the memory access request utilizing other, possibly conventional processing, as shown at block 814. This other processing may include, for example, reissuing the memory access request with a broader scope of broadcast, such as a group scope or global scope. Following block 814, the process of FIG. 8 ends at block 820.

Figure 9:
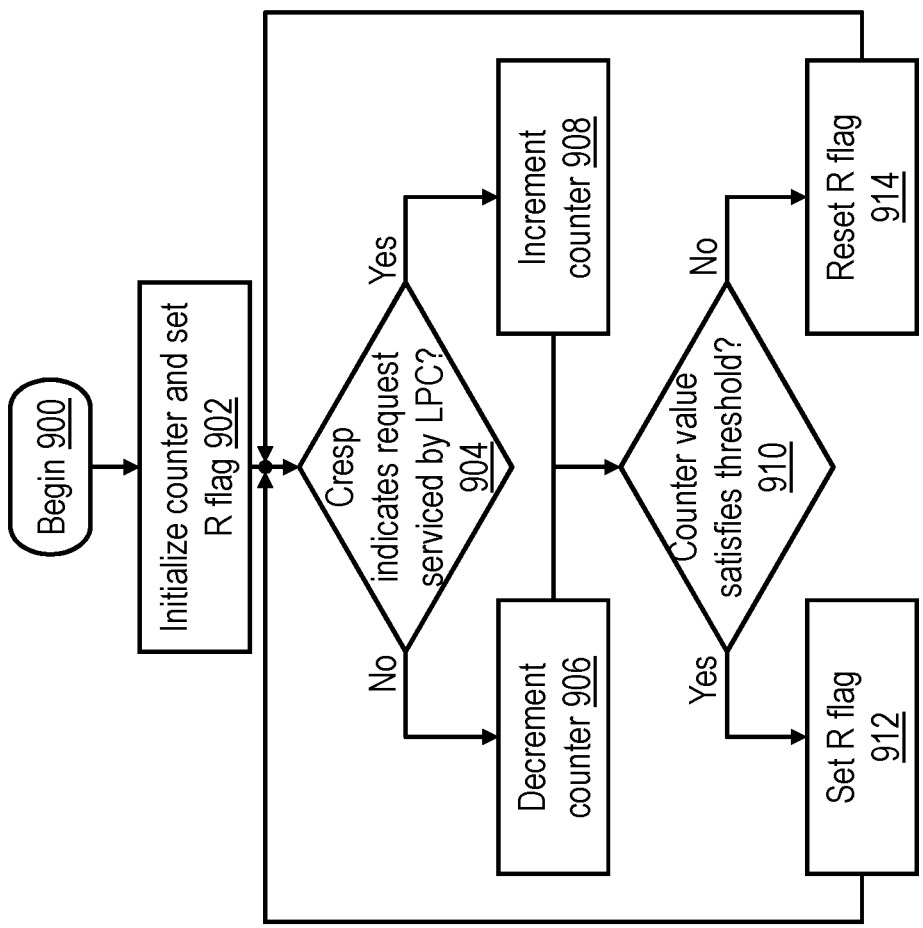
FIG. 9 is a high-level logical flowchart of an exemplary process by which a predictor indicates whether or not to issue a memory access request with a remote scope of broadcast in accordance with one embodiment.

With reference to FIG. 9, there is illustrated a high-level logical flowchart of an exemplary process by which a predictor indicates whether or not to issue a memory access request on the system fabric of a data processing system 100 with a remote node scope of broadcast in accordance with one embodiment. The illustrated process can be performed, for example, by optional L2 predictor 325 in order to facilitate the broadcast scope selection made at block 806 of FIG. 8. As noted above, in one exemplary embodiment, L2 predictor 325 includes a saturating counter 327 that is constrained to have a non-negative value and a remote scope (R) flag 329 that is set to indicate that a master should employ a local node scope or remote scope of broadcast for the initial issuance of a memory access request and that is reset otherwise.

The process of FIG. 9 begins at block 900 and then proceeds to block 902, which illustrates L2 predictor 325 initializing counter 327 (e.g., to 0) and setting R flag 329 to indicate use of the local node or remote scope of broadcast for the initial issuance of a memory access request. At block 904, L2 predictor 325 monitors the system fabric to detect a Cresp for a memory access request on the system fabric. In some embodiments, L2 predictor 325 may monitor for the Cresps of only memory access requests issued by the associated processing unit 104; in other embodiments, L2 predictor 325 may monitor for the Cresps of any memory access requests. In response to detection of a Cresp, the master determines at block 904 whether or not the Cresp indicates that the memory access request was serviced by a LPC (e.g., IMC 206, I/O controller 214, bus bridge, or other coherence participant assigned a particular range of real addresses). If so, L2 predictor 325 increments counter 327 in a saturating fashion (block 908), and the process proceeds to block 910. If not, meaning that the memory access request was serviced by a L2 cache 230, L2 predictor 325 decrements counter 327 to a value of no less than 0 (block 906), and the process proceeds to block 910.

Block 910 illustrates L2 predictor 325 determining whether or not the value of counter 327 satisfies (e.g., is greater than or equal to) a threshold. If not, L2 predictor 325 resets R flag 329 to indicate that a local node scope or remote scope of broadcast should not be used for the initial issuance of a memory access request (block 914). If, however, L2 predictor 325 determines at block 910 that the value of counter 327 satisfies the threshold, L2 predictor 325 sets R flag 329 to indicate a local node scope or remote scope of broadcast should be used for the initial issuance of a memory access request (block 912). Following block 912 or block 914, the process of FIG. 9 returns to block 904, which has been described.

Figure 10:
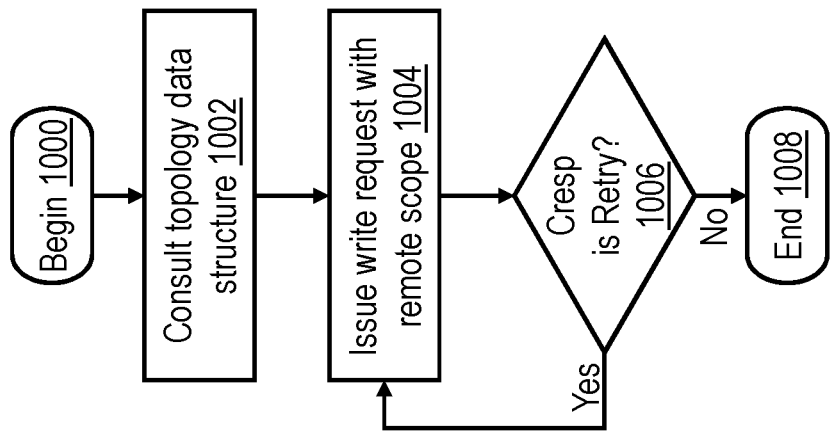
FIG. 10 is a high-level logical flowchart of an exemplary process by which a coherence participant issues a write request on the system fabric of a data processing system in accordance with one embodiment.

Referring now to FIG. 10, there is depicted a high-level logical flowchart of an exemplary process by which a coherence participant issues a write request on the system fabric of a data processing system 101 in accordance with one embodiment. The illustrated process may be employed, for example, by a CO machine 310 to issue a castout (CO) request that updates system memory 108 or by a SN machine 311 to issue a push request that updates system memory 108.

The process begins at block 1000, for example, in response to the coherence participant determining to issue, on the system fabric of data processing system 100, a write request that targets the IMC 206 of one of system memories 108 or another LPC. The process then proceeds to block 1002, which illustrates the coherence participant consulting topology data structure 359 utilizing the index 614 of the target real address 610 specified by the write request to determine a physical location within data processing system 100 of the IMC 206 or other LPC that is the target of the memory access request. Utilizing the LPC location information provided by topology data structure 359, the coherence participant issues, on the system fabric of data processing system, a write request with a remote scope of broadcast that includes only the local node 102 and the remote node 102 containing the LPC (block 1004). The coherence participant then monitors the system fabric for receipt of the Cresp for the write request and, in response to receipt of the Cresp, determines if the Cresp is a Retry Cresp (block 1006). If so, the process returns to block 1004, representing the coherence participant continuing to reissue the write request with the selected remote scope of broadcast until a Cresp other than a Retry Cresp (i.e., a Cresp indicating success) is received at block 1006. In response to receipt of Cresp indicating success of the write request, the process of FIG. 10 ends at block 1008. It will be appreciated by those skilled in the art that, in contrast to operations handled by FIG. 8, castout and push operations are communications between only an HPC cache and the LPC agent representing the addressed portion of the real memory space. As such, other caches do not participate in these operations, and a remote node scope is all that is necessary to effect castout and push operations. Further, in some embodiments, a castout or push operation may alternatively or additionally employ a "remote node only" scope of broadcast because castout and push operations need not be snooped by the local node of the issuing HPC cache if the LPC for the target real address is contained in another node.

Figure 11:
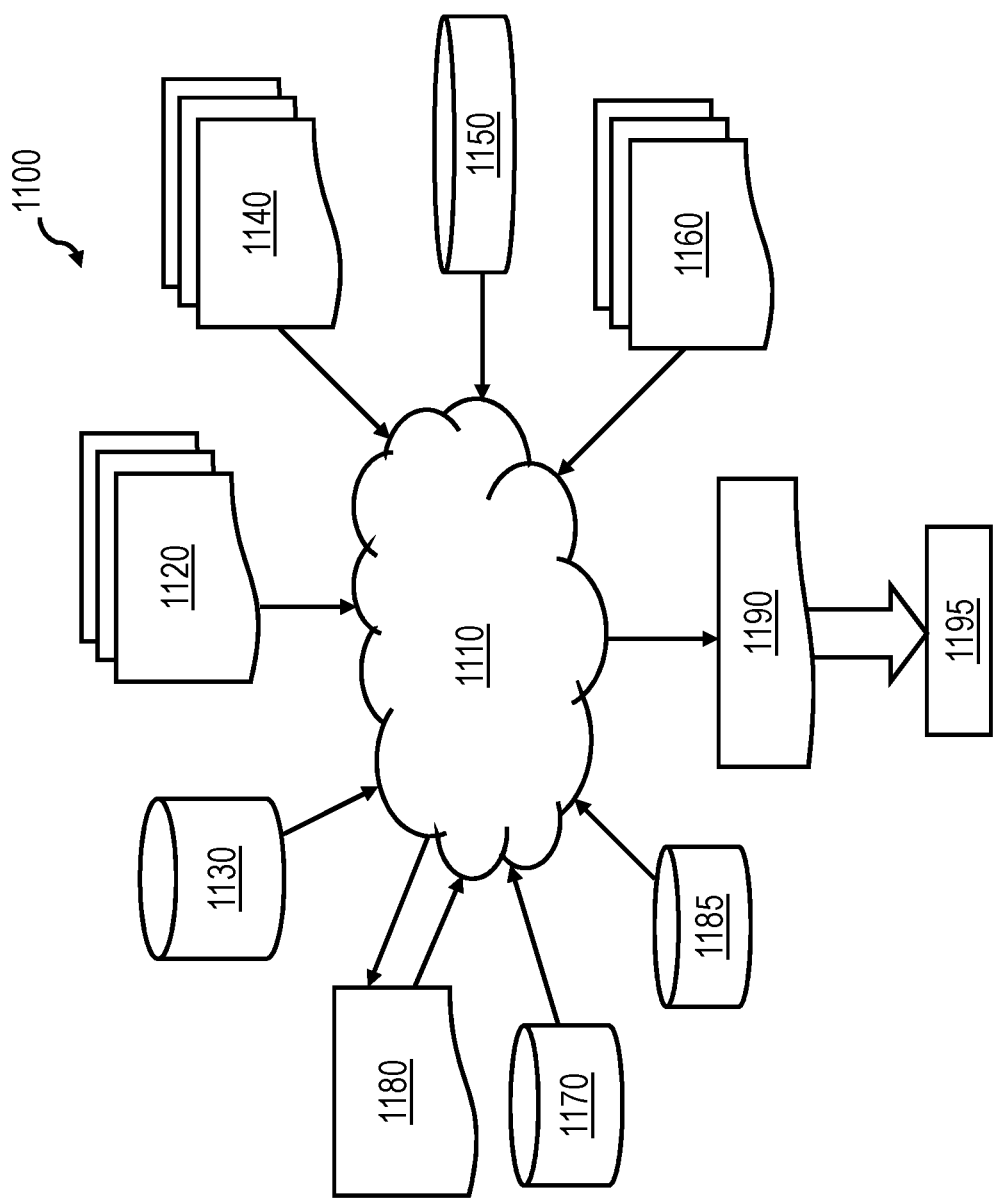
FIG. 11 illustrates an exemplary design process in accordance with one embodiment.

Referring now to FIG. 11, there is depicted a block diagram of an exemplary design flow 1100 used for example, in semiconductor IC logic design, simulation, test, layout, and manufacture. Design flow 1100 includes processes, machines and/or mechanisms for processing design structures or devices to generate logically or otherwise functionally equivalent representations of the design structures and/or devices described above and shown herein. The design structures processed and/or generated by design flow 1100 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1100 may vary depending on the type of representation being designed. For example, a design flow 1100 for building an application specific IC (ASIC) may differ from a design flow 1100 for designing a standard component or from a design flow 1100 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 1020 that is preferably processed by a design process 1110. Design structure 1120 may be a logical simulation design structure generated and processed by design process 1110 to produce a logically equivalent functional representation of a hardware device. Design structure 1120 may also or alternatively comprise data and/or program instructions that when processed by design process 1110, generate a functional representation of the physical structure of a hardware device. Whether representing functional and/or structural design features, design structure 1120 may be generated using electronic computer-aided design (ECAD) such as implemented by a core developer/designer. When encoded on a machine-readable data transmission, gate array, or storage medium, design structure 1120 may be accessed and processed by one or more hardware and/or software modules within design process 1110 to simulate or otherwise functionally represent an electronic component, circuit, electronic or logic module, apparatus, device, or system such as those shown herein. As such, design structure 1120 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1110 preferably employs and incorporates hardware and/or software modules for synthesizing, translating, or otherwise processing a design/simulation functional equivalent of the components, circuits, devices, or logic structures shown herein to generate a netlist 1180 which may contain design structures such as design structure 1120. Netlist 1180 may comprise, for example, compiled or otherwise processed data structures representing a list of wires, discrete components, logic gates, control circuits, I/O devices, models, etc. that describes the connections to other elements and circuits in an integrated circuit design. Netlist 1180 may be synthesized using an iterative process in which netlist 1180 is resynthesized one or more times depending on design specifications and parameters for the device. As with other design structure types described herein, netlist 1180 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1110 may include hardware and software modules for processing a variety of input data structure types including netlist 1180. Such data structure types may reside, for example, within library elements 1130 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1140, characterization data 1150, verification data 1160, design rules 11110, and test data files 1185 which may include input test patterns, output test results, and other testing information. Design process 1110 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1110 without deviating from the scope and spirit of the invention. Design process 1110 may also include modules for performing standard circuit design processes such as timing analysis, verification, design rule checking, place and route operations, etc.

Design process 1110 employs and incorporates logic and physical design tools such as HDL compilers and simulation model build tools to process design structure 1120 together with some or all of the depicted supporting data structures along with any additional mechanical design or data (if applicable), to generate a second design structure 1190. Design structure 1190 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1120, design structure 1190 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1190 may comprise a compiled, executable HDL simulation model that functionally simulates the devices shown herein.

Design structure 1190 may also employ a data format used for the exchange of layout data of integrated circuits and/or symbolic data format (e.g., information stored in a GDSII (GDS2), GL1, OASIS, map files, or any other suitable format for storing such design data structures). Design structure 1190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1190 may then proceed to a stage 1195 where, for example, design structure 1190: proceeds to tape-out, is released to manufacturing, is released to a mask house, is sent to another design house, is sent back to the customer, etc.

As has been described, in at least one embodiment, a coherent data processing system includes a system fabric communicatively coupling a plurality of nodes arranged in a plurality of groups. A plurality of coherence agents are distributed among the nodes and are assigned responsibility for certain addresses. A topology data structure indicates by group and node differing physical locations within the data processing system of the plurality of coherence agents. A master in the data processing system accesses the topology data structure utilizing a request address to obtain a particular group and node of a particular coherence agent uniquely assigned the request address. The master initially issues, on the system fabric, a memory access request specifying the request address and utilizing a remote scope of broadcast that includes the particular node and excludes at least one other node in the particular group, where the particular node is a different one of the plurality of nodes than a home node containing the master.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a coherent data processing system including a system fabric communicatively coupling a plurality of nodes arranged in a plurality of groups, wherein a plurality of coherence agents distributed among the nodes are assigned responsibility for certain addresses, said method comprising:
   maintaining a topology data structure indicating, by group and node, differing physical locations within the data processing system of the plurality of coherence agents, wherein:
      the topology data structure includes a plurality of entries each associated with a respective one of a plurality of values of an index portion of a request address; and
      each of the plurality of entries includes a field including one or more bits for indicating group membership and one or more bits for indicating node membership;
   a master in the data processing system accessing one of the plurality of entries in the topology data structure utilizing the index portion of the request address to obtain a particular group and particular node of a particular coherence agent among the plurality of coherence agents uniquely assigned the request address; and
   based on the accessing, the master initially issuing, on the system fabric, a memory access request specifying the request address and utilizing a remote scope of broadcast that includes the particular node and excludes at least one other node in the particular group, wherein the particular node is a different one of the plurality of nodes than a home node containing the master.

2. The method of claim 1, wherein the remote scope includes only the home node and the particular node.

3. The method of claim 1, further comprising:
   indicating, in a mode field associated with the topology data structure, a selected one of a plurality of different allocations of bits in the field between bits indicating group membership and bits indicating node membership.

4. The method of claim 1, wherein:
   the particular coherence agent is a memory controller; and
   the memory access request is a memory write request that updates a system memory controlled by the memory controller.

5. The method of claim 1, further comprising:
   maintaining a predictor that indicates whether or not the master is to employ the remote scope of broadcast based on which coherence participants serviced prior memory access requests; and
   the master initially issuing, on the system fabric, the memory access request utilizing the remote scope of broadcast comprises the master initially issuing the memory access request utilizing the remote scope of broadcast based on the predictor indicating to employ the remote scope of broadcast.

6. A processing unit for a coherent data processing system including a system fabric communicatively coupling a plurality of nodes arranged in a plurality of groups, wherein a plurality of coherence agents distributed among the nodes are assigned responsibility for certain addresses, the processing unit comprising:
   a processor core;
   interconnect logic configured to couple the processing unit to the system fabric of the data processing system;
   a topology data structure indicating, by group and node, differing physical locations within the data processing system of the plurality of coherence agents, wherein:
      the topology data structure includes a plurality of entries each associated with a respective one of a plurality of values of an index portion of a request address; and
      each of the plurality of entries includes a field including one or more bits for indicating group membership and one or more bits for indicating node membership;
   a master configured to perform:
      accessing one of the plurality of entries in the topology data structure utilizing the index portion of the request address to obtain a particular group and particular node of a particular coherence agent among the plurality of coherence agents uniquely assigned the request address; and
      based on the accessing, initially issuing, on the system fabric, a memory access request specifying the request address and utilizing a remote scope of broadcast that includes the particular node and excludes at least one other node in the particular group, wherein the particular node is a different one of the plurality of nodes than a home node containing the master.

7. The processing unit of claim 6, wherein the remote scope includes only the home node and the particular node.

8. The processing unit of claim 7, further comprising:
   a mode field associated with the topology data structure, wherein the mode field indicates a selected one of a plurality of different allocations of bits in the field between bits indicating group membership and bits indicating node membership.

9. The processing unit of claim 6, wherein:
   the particular coherence agent is a memory controller; and
   the memory access request is a memory write request that updates a system memory controlled by the memory controller.

10. The processing unit of claim 6, further comprising:
a predictor that indicates whether or not the master is to employ the remote scope of broadcast based on which coherence participants serviced prior memory access requests; and
wherein the master initially issues the memory access request utilizing the remote scope of broadcast based on the predictor indicating to employ the remote scope of broadcast.

11. A data processing system, comprising:
a plurality of processing units in accordance with claim 6; and
the system fabric communicatively coupling the plurality of processing units.

12. A design structure tangibly embodied in a computer readable storage device for designing, manufacturing, or testing an integrated circuit, the design structure comprising:
a processing unit for a coherent data processing system including a system fabric communicatively coupling a plurality of nodes arranged in a plurality of groups, wherein a plurality of coherence agents distributed among the nodes are assigned responsibility for certain addresses, the processing unit including:
a processor core;
interconnect logic configured to couple the processing unit to the system fabric of the data processing system;
a topology data structure indicating, by group and node, differing physical locations within the data processing system of the plurality of coherence agents, wherein:
the topology data structure includes a plurality of entries each associated with a respective one of a plurality of values of an index portion of a request address; and
each of the plurality of entries includes a field including one or more bits for indicating group membership and one or more bits for indicating node membership;
a master configured to perform:
accessing one of the plurality of entries in the topology data structure utilizing the index portion of the request address to obtain a particular group and particular node of a particular coherence agent among the plurality of coherence agents uniquely assigned the request address; and
based on the accessing, initially issuing, on the system fabric, a memory access request specifying the request address and utilizing a remote scope of broadcast that includes the particular node and excludes at least one other node in the particular group, wherein the particular node is a different one of the plurality of nodes than a home node containing the master.

13. The design structure of claim 12, wherein the remote scope includes only the home node and the particular node.

14. The design structure of claim 12, further comprising:
a mode field associated with the topology data structure, wherein the mode field indicates a selected one of a plurality of different allocations of bits in the field between bits indicating group membership and bits indicating node membership.

15. The design structure of claim 12, wherein:
the particular coherence agent is a memory controller; and
the memory access request is a memory write request that updates a system memory controlled by the memory controller.

16. The design structure of claim 12, further comprising:
a predictor that indicates whether or not the master is to employ the remote scope of broadcast based on which coherence participants serviced prior memory access requests; and
wherein the master initially issues the memory access request utilizing the remote scope of broadcast based on the predictor indicating to employ the remote scope of broadcast.

* * * * *